(12) United States Patent
Yu

(10) Patent No.: US 10,093,373 B2
(45) Date of Patent: Oct. 9, 2018

(54) LOAD-BEARING FRAME OF A BICYCLE SADDLE

(71) Applicant: VELO ENTERPRISE CO., LTD., Taichung (TW)

(72) Inventor: Tsai-Yun Yu, Taichung (TW)

(73) Assignee: VELO ENTERPRISE CO., LTD., Taichung (TW)

( * ) Notice: Subject to any disclaimer, the term of this patent is extended or adjusted under 35 U.S.C. 154(b) by 56 days.

(21) Appl. No.: 15/285,005

(22) Filed: Oct. 4, 2016

(65) Prior Publication Data
US 2017/0113748 A1 Apr. 27, 2017

(30) Foreign Application Priority Data
Oct. 21, 2015 (TW) .............................. 104134588 A

(51) Int. Cl.
| B62J 1/08 | (2006.01) |
| B62J 1/00 | (2006.01) |
| B62J 1/18 | (2006.01) |
| B62J 1/26 | (2006.01) |

(52) U.S. Cl.
CPC ............... B62J 1/08 (2013.01); B62J 1/007 (2013.01); B62J 1/18 (2013.01); B62J 1/26 (2013.01)

(58) Field of Classification Search
CPC ....... B62J 1/007; B62J 1/08; B62J 1/18; B62J 1/26
See application file for complete search history.

(56) References Cited

U.S. PATENT DOCUMENTS

| 5,203,607 | A | * | 4/1993 | Landi | B62J 1/26 297/214 |
| 5,294,173 | A | * | 3/1994 | Yu | B62J 1/08 297/195.1 |
| 5,348,369 | A | * | 9/1994 | Yu | B62J 1/00 297/195.1 |
| 5,714,108 | A | * | 2/1998 | Girardi | B29C 44/027 156/85 |
| 6,095,601 | A | * | 8/2000 | Yu | B62J 1/00 297/202 |
| 6,343,836 | B1 | * | 2/2002 | Yu | B62J 1/00 297/195.1 |
| 6,402,234 | B1 | * | 6/2002 | Yu | B62J 1/08 248/298.1 |
| 6,443,524 | B1 | * | 9/2002 | Yu | B62J 1/02 297/195.1 |
| 6,629,728 | B2 | * | 10/2003 | Losio | B62J 1/002 297/180.1 |

(Continued)

*Primary Examiner* — James M Ference
(74) *Attorney, Agent, or Firm* — Browdy and Neimark, PLLC

(57) ABSTRACT

A load-bearing frame of a bicycle saddle comprises a base and a rim surrounding the base. The base is made of a first plastic material of predetermined rigidity and includes a relatively narrow anterior portion and a relatively wider posterior portion. The base further has a top surface, a bottom surface, and a peripheral edge. The rim is made of a second plastic material of rigidity being smaller than that of the first plastic material. The rim has an inner side coupled with the periphery edge of the base and an outer side extending upwardly from the inner side to define a first receiving space with a first upper opening.

3 Claims, 4 Drawing Sheets

(56) References Cited

U.S. PATENT DOCUMENTS

| | | | | |
|---|---|---|---|---|
| 6,957,857 B1* | 10/2005 | Lee | | B62J 1/00 297/195.1 |
| 7,022,275 B2* | 4/2006 | Bigolin | | B62J 1/00 264/153 |
| 2003/0042770 A1* | 3/2003 | Yu | | B62J 1/00 297/215.16 |
| 2003/0071498 A1* | 4/2003 | Yu | | B62J 1/00 297/215.16 |
| 2004/0004373 A1* | 1/2004 | Garland | | B62J 1/00 297/195.1 |
| 2005/0046245 A1* | 3/2005 | Yu | | B62J 1/00 297/214 |
| 2005/0104423 A1* | 5/2005 | Yu | | B62J 1/00 297/214 |
| 2005/0121951 A1* | 6/2005 | Yu | | B62J 1/00 297/195.1 |
| 2006/0049675 A1* | 3/2006 | Fregonese | | B62J 1/00 297/215.16 |
| 2006/0263551 A1* | 11/2006 | Tomeo | | B29C 44/1257 428/34.1 |
| 2007/0246978 A1* | 10/2007 | Yu | | B62J 1/00 297/214 |
| 2008/0193699 A1* | 8/2008 | Terreni | | B29C 44/1257 428/45 |
| 2009/0108643 A1* | 4/2009 | Yu | | B62J 1/00 297/214 |
| 2009/0108644 A1* | 4/2009 | Yu | | B62J 1/22 297/214 |
| 2009/0152912 A1* | 6/2009 | Yu | | B62J 1/002 297/195.1 |
| 2009/0189421 A1* | 7/2009 | Yu | | B62J 1/00 297/195.1 |
| 2010/0019553 A1* | 1/2010 | Yu | | B62J 1/00 297/214 |
| 2010/0045084 A1* | 2/2010 | Segato | | B62J 1/007 297/195.1 |
| 2010/0225148 A1* | 9/2010 | Segato | | B62J 1/00 297/195.1 |
| 2013/0229037 A1* | 9/2013 | Yu | | B62J 1/00 297/195.1 |
| 2014/0265466 A1* | 9/2014 | Yu | | B62J 1/00 297/195.1 |
| 2014/0319717 A1* | 10/2014 | Yu | | B32B 5/20 264/46.4 |
| 2015/0175228 A1* | 6/2015 | Yu | | B62J 1/002 297/202 |
| 2015/0191209 A1* | 7/2015 | Yeh | | B62J 1/26 297/214 |
| 2016/0052579 A1* | 2/2016 | Yu | | B62J 1/00 297/195.1 |
| 2017/0113748 A1* | 4/2017 | Yu | | B62J 1/007 |

* cited by examiner

LOAD-BEARING FRAME OF A BICYCLE SADDLE

BACKGROUND OF THE INVENTION

1. Field of the Invention

The present invention relates to bicycle saddles and in particular to a load-bearing frame of a bicycle saddle.

2. Description of the Related Art

A known bicycle saddle generally comprises a load-bearing frame and a padding which is fixed on the top surface of the frame. For being adapted to support the body weight of the user and allowing attachment of the saddle onto a bicycle or similar vehicle by suitable fastening means, the whole frame is typically made of rigid materials. The primary drawback of such a prior art frame is that the inside thigh parts of the rider, during pedaling, repeatedly contact the side edge of the rigid frame, thereby causing periodic rubbing and consequent local irritations. Furthermore, in order to run through steep descents or avoid obstacles, riders would rather have their body only supported at the rear part of the saddle. As a result, the muscles of legs and buttocks of riders would directly contact the outer peripheral edge of the rigid frame which thereby creates a localized pressure concentration which adversely affects rider comfort.

For reducing or avoiding the drawback of the prior art frame mentioned above, one possible solution is provided by U.S. Pat. No. 8,919,875. The solution is to provide a frame with a peripheral edge which is constructed to have strip-shaped openings so that the peripheral edge of the frame is more flexible than any other place of the frame. While the frame disclosed in that patent can provide more comfort during pedaling, the outer peripheral edge of the frame is easily fractured due to that the structural intensity thereof is decreased by such strip-shaped openings.

For the foregoing reasons, there is a need for a new frame of a bicycle saddle which has a flexible peripheral edge with enough structural intensity.

SUMMARY OF THE INVENTION

Accordingly, the present invention is directed to a load-bearing frame of a bicycle saddle that satisfies the need. A load-bearing frame of a bicycle saddle having features of the present invention comprises a base and a rim surrounding the base. The base is made of a first plastic material of predetermined rigidity and includes a relatively narrow anterior portion for fitting between the crotch of a bicycle rider and a relatively wider posterior portion for supporting the buttocks of a bicycle rider. The base further has a top surface, a bottom surface, and a peripheral edge. The rim is made of a second plastic material of rigidity being smaller than that of the first plastic material. The rim further has an inner side coupled with the periphery edge of the base and an outer side extending from the inner side upwardly outwardly in such a way that a first receiving space with a first upper opening is defined between the inner side and the outer side.

BRIEF DESCRIPTION OF THE DRAWINGS

These and other features, aspects, and advantages of the present invention will become better understood with reference to the following description, appended claims, and accompanying drawings wherein:

DETAILED DESCRIPTION OF PREFERRED EMBODIMENTS

Figure 1:
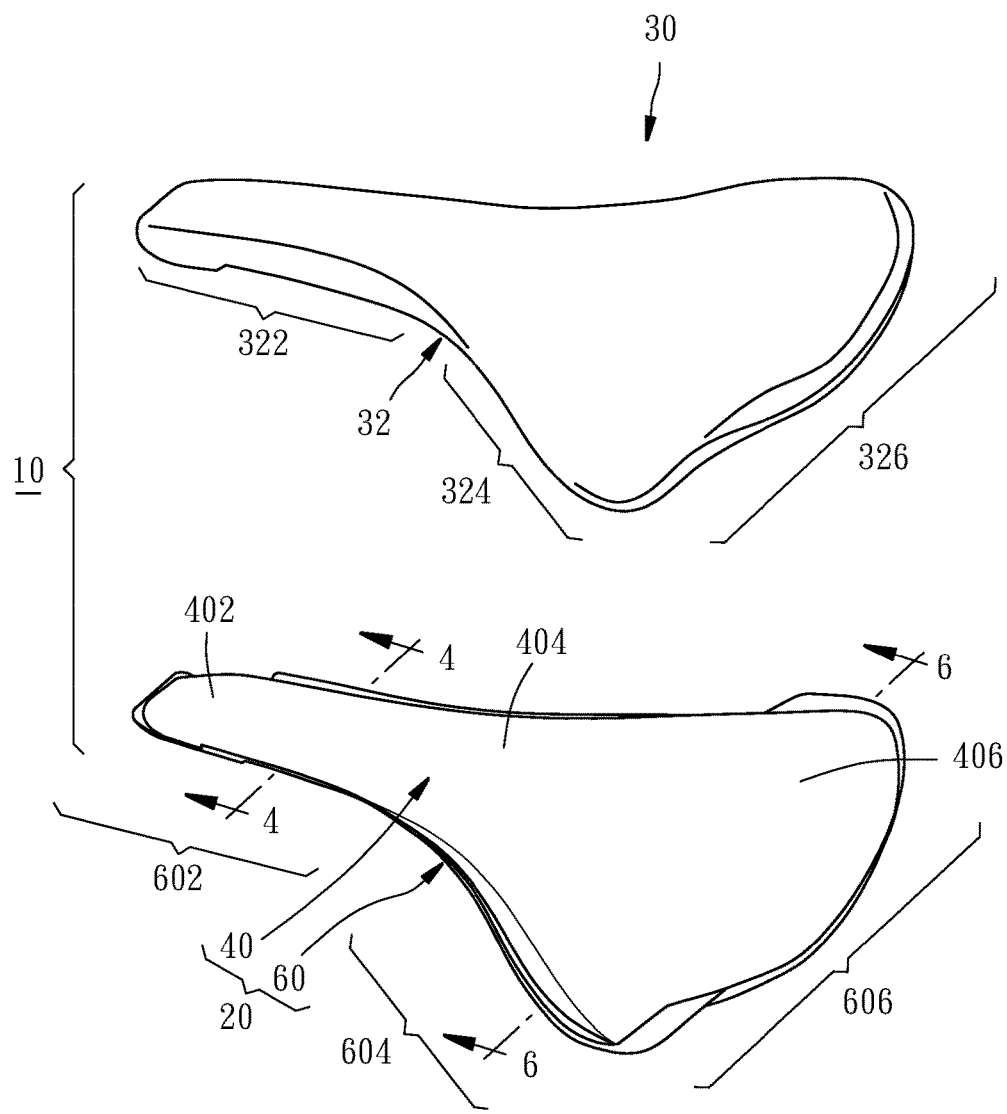
FIG. 1 is an exploded view of a bicycle saddle with a load-bearing frame embodied according to the present invention.
Figure 2:
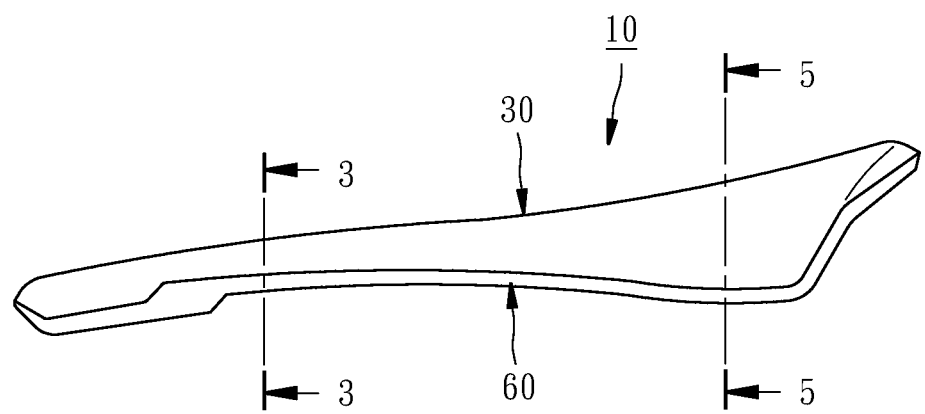
FIG. 2 is a side view of the whole bicycle saddle shown in FIG. 1.

With reference to the cited figures, a bicycle saddle is generally designated by the reference numeral 10. The saddle 10 comprises a load-bearing frame 20 and a padding 30.

The frame 20 includes a base 40 and a rim 60 surrounding the base 40. The base 40 is made of a first plastic material of predetermined rigidity. In this embodiment, the first plastic material includes a nylon material sold under the trademark Nylon 11 or Polyamide 11 and carbon fiber materials. The base 40 has a top surface 42, a bottom surface 44, and a peripheral edge 46. As described in shape, the base 40 generally has a relatively narrow anterior portion 402 for fitting between the crotch of a bicycle rider and a relatively wider posterior portion 406 for supporting the buttocks of a bicycle rider. In this embodiment, the base 40 further includes a transiting portion 404 disposed between the narrow anterior portion 402 and the wider posterior portion 406 such that the width of the base 40 is gradually increased from the narrow anterior portion 402 to the wider posterior portion 406.

Figure 4:
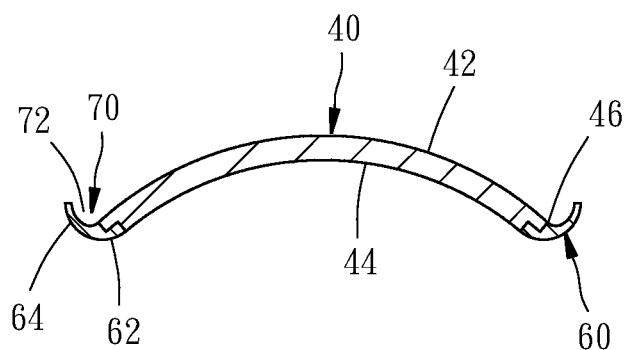
FIG. 4 is a sectional view of the frame of the bicycle saddle taken along the line 4-4 of FIG. 1.
Figure 6:
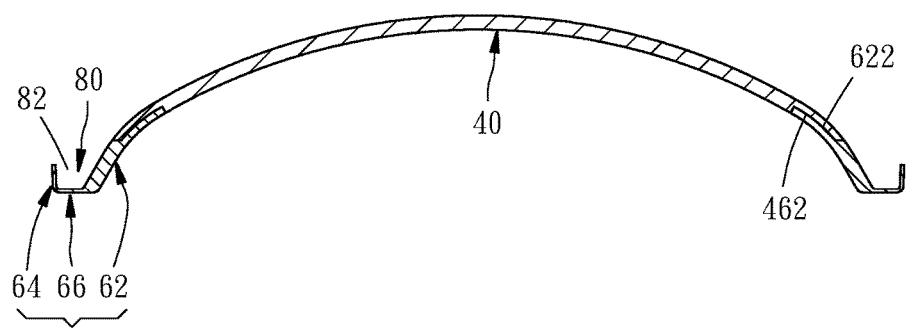
FIG. 6 is a sectional view of the frame of the bicycle saddle taken along the line 6-6 of FIG. 1.

The rim 60 is made of a second plastic material of rigidity being smaller than that of the first plastic material. In this embodiment, the second plastic material is a nylon material sold under the trademark Pebax. The rim 60 and the base 40 can be combined by a molding process. The entire profile of the rim 60 can be divided into a first section 602 corresponding the narrow anterior portion 402 of the base 40, a second section 604 corresponding the transiting portion 404 of the base 40, and a third section 606 corresponding the wider posterior portion 406 of the base 40. The first and third sections 602, 606 of the rim 60 both have an inner side 62 and an outer side 64. The inner side 62 is coupled with the peripheral edge 46 of the base 40. The outer side 64 extends upwardly outwardly from the inner side 62 in such a way that a first receiving space 70 with a first upper opening 72 is defined between the inner side 62 and the outer side 64 (as shown in FIG. 4). The second section 604 of the rim 60 has the inner side 62, the outer side 64 and a middle part 66 disposed on therebetween. The middle part 66 extends horizontally outwardly from the inner side 62 in such a way that a second receiving space 80 with a second upper opening 82 and a width being larger than that of the first receiving space 70 is defined between said inner side 62 and said outer side 64. (as shown in FIG. 6).

In addition, the peripheral edge 46 of the base 40 has a first connecting portion 462 and the inner side 62 of the rim 60 has a second connecting portion 622 being complementary to the first connecting portion 462 and connected therewith. In this embodiment, the first connecting portion 462 has a first depression and the second connecting portion 622 has a second depression such that the base 40 and the rim 60 are combined together in a surface flatness manner.

Figure 3:
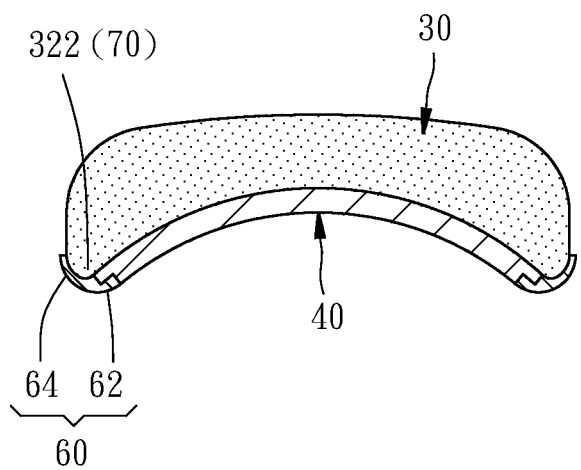
FIG. 3 is a sectional view of the bicycle saddle taken along the line 3-3 of FIG. 2.
Figure 5:
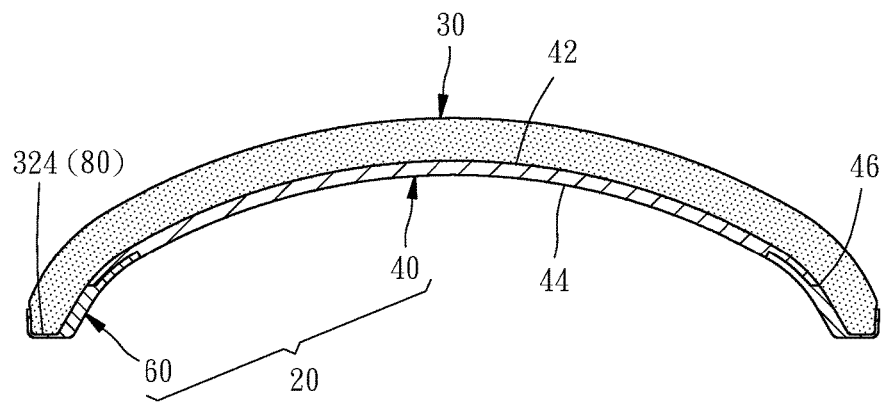
FIG. 5 is a sectional view of the bicycle saddle taken along the line 5-5 of FIG. 2.

The padding 30 is made of a material having a substantially elastic behavior, such as a polymer foam, and secured on the top surface 42 of the base 40 to absorb the shock produced during riding. In this embodiment, the padding 30 has an outer edge 32 which can be divided into a first part 322, a second part 324 and a third part 326. The width of the second part 324 is larger than that of the first part 322 and the third part 326 such that the second part 324 is received in the second receiving space 80 from the second upper opening 82 thereof (as shown in FIG. 5), and the first part 322 and the third part 326 are received respectively in the first receiving space 70 from the first upper opening 72 (as shown in FIG. 3).

For having the construction mentioned above, the load-bearing frame provided by the present invention would have a flexible peripheral edge with enough structural intensity so that the drawback of the prior art frame is effectively reduced or avoided.

What is claimed is:

1. A load-bearing frame of a bicycle saddle, said bicycle saddle including a padding secured on said frame, said frame comprising:

a base made of a first plastic material having a predetermined rigidity and having an anterior portion and a posterior portion, said anterior portion having a width that is narrower than a width of said posterior portion, said base comprising a top surface, a bottom surface, and a peripheral edge;

a rim made of a second plastic material having a rigidity that is less than the predetermined rigidity of said first plastic material; and said rim having an inner side coupled with said peripheral edge of said base, and an outer side extending from said inner side upwardly and outwardly in such a way that a first receiving space with a first upper opening is defined between said inner side and said outer side, wherein said base further comprises a transiting portion disposed between said anterior portion and said posterior portion, and wherein said rim further includes a first section corresponding to said anterior portion of said base, a second section corresponding to said transiting portion of said base, and a third section corresponding to said posterior of said base; said second section further has a middle part disposed between said inner side and said outer side and extending horizontally and outwardly from said inner side in such a way that a second receiving space with a second upper opening and a width that is larger than a width of said first receiving space is defined between said inner side and said outer side.

2. The frame as claimed in claim 1, wherein said peripheral edge of said base has a first connecting portion and said inner side of said rim has a second connecting portion that is complementary to said first connecting portion, said second connecting portion being connected to said first connecting portion.

3. The frame as claimed in claim 2, wherein said first connecting portion includes a first depression, and wherein said second connecting portion includes a second depression connected with said first depression such that said base and said rim are combined together to form a flat surface.

* * * * *